United States Patent [19]

Derouane et al.

[11] Patent Number: 4,713,227

[45] Date of Patent: * Dec. 15, 1987

[54] METHOD FOR THE SYNTHESIS OF METALLOPHOSPHOALUMINATES

[75] Inventors: Eric G. Derouane, Namur, Belgium; Roland V. Ballmoos, Hopewell, N.J.

[73] Assignee: Mobil Oil Corporation, New York, N.Y.

[*] Notice: The portion of the term of this patent subsequent to Jun. 16, 2004 has been disclaimed.

[21] Appl. No.: 878,145

[22] Filed: Jun. 25, 1986

Related U.S. Application Data

[63] Continuation-in-part of Ser. No. 804,326, Dec. 4, 1985, abandoned, which is a continuation of Ser. No. 615,391, May 30, 1984, abandoned.

[51] Int. Cl.$^4$ .............................................. C01B 25/45
[52] U.S. Cl. ..................................... 423/305; 423/306; 423/328; 423/329; 423/326; 502/208; 502/213; 502/214
[58] Field of Search ............... 423/305, 306, 326, 328; 502/208, 214, 213

[56] References Cited

U.S. PATENT DOCUMENTS

| | | | |
|---|---|---|---|
| 4,440,871 | 4/1984 | Lok et al. | 502/214 |
| 4,554,143 | 11/1985 | Messina et al. | 423/306 |
| 4,567,029 | 1/1986 | Wilson et al. | 423/306 |
| 4,569,833 | 2/1986 | Gortsema et al. | 423/305 |
| 4,619,818 | 10/1986 | Derouane et al. | 423/306 |
| 4,623,527 | 11/1986 | Derouane et al. | 502/214 |
| 4,632,811 | 12/1986 | Derouane et al. | 423/306 |

*Primary Examiner*—John Doll
*Assistant Examiner*—Jackson Leeds
*Attorney, Agent, or Firm*—Alexander J. McKillop; Michael G. Gilman; Dennis P. Santini

[57] ABSTRACT

Crystalline metallophosphoaluminates are prepared by hydrothermal crystallization utilizing a reaction mixture containing a substantially water-immiscible organic solvent wherein one of the aluminum, phosphorus or oxide sources is soluble in the organic solvent.

13 Claims, No Drawings

METHOD FOR THE SYNTHESIS OF METALLOPHOSPHOALUMINATES

BACKGROUND OF THE INVENTION

This application is a continuation-in-part of application Ser. No. 804,326, filed Dec. 4, 1985, now abandoned, which in turn is a continuation of application Ser. No. 615,391, filed May 30, 1984, and now abandoned.

FIELD OF THE INVENTION

Crystalline metallophosphoaluminates, having ion-exchange properties and readily convertible to catalytically active materials, are synthesized in a novel way from a reaction medium including a water-immiscible organic solvent.

DESCRIPTION OF THE PRIOR ART

Aluminum phosphates are taught in U.S. Pat. Nos. 4,310,440 and 4,385,994, for example. Aluminum phosphate materials have electroneutral lattices and, therefore, are not useful as ion-exchangers or as catalyst components. Microporous aluminum phosphates have a composition typified as:

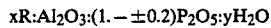

wherein R is an organic amine or quaternary ammonium salt entrapped within the aluminum phosphate and playing a role as crystallization template, x and y representing the amounts of R and $H_2O$ needed to fill the microporous voids. Because of the aluminum/phosphorus atomic ratio of these materials being about unity, they display virtually no ion-exchange properties, the framework positive charge on phosphorus being balanced by corresponding negative charge on aluminum:

The phosphorus-substituted zeolites of Canadian Pat. Nos. 911,416; 911,417 and 911,418 are referred to as "aluminosilicophosphate" zeolites. Some of the phosphorus therein appears to be occluded, not structural. These latter materials containing silicon, aluminum and phosphorus are characterized by the general formula:

wherein M is a monovalent cation, x is approximately 0.125–1.5, y is 0.05–1.0 and z is the number of hydration water molecules. Structural replacement of silicon with phosphorus has been realized in materials called silica clathrates (West Germany Pat. No. 3,128,988).

U.S. Pat. No. 4,363,748 describes a combination of silica and aluminum-calcium-cerium phosphate as a low acid activity catalyst for oxidative dehydrogenation. Great Britian Patent No. 2,068,253 discloses a combination of silica and aluminum-calcium-tungsten phosphate as a low acid activity catalyst for oxidative dehydrogenation, U.S. Pat. No. 3,801,704 teaches an aluminum phosphate treated in a certain way to impart acidity. U.S. Pat. No. 4,228,036 teaches an alumina-aluminum phosphate-silica matrix as an amorphous body to be mixed with zeolite for use as cracking catalyst. U.S. Pat. No. 3,213,035 teaches improving hardness of aluminosilicate catalysts by treatment with phosphoric acid. The catalysts are amorphous.

U.S. Pat. No. 2,876,266 describes an active silicophosphoric acid or salt phase of an amorphous material prepared by absorption of phosphoric acid by premolded silicates or aluminosilicates.

Other teachings of aluminum phosphates and their preparation include U.S. Pat. Nos. 4,365,095; 4,361,705; 4,222,896; 4,210,560; 4,179,358; 4,158,621; 4,071,471; 4,014,945; 3,904,550 and 3,697,550. Since their neutral framework structure is void of ion-exchange properties, they are used as catalyst supports or matrices.

U.S. Pat. No. 4,440,871 discloses microporous silicoaluminophosphates exhibiting properties somewhat analogous to zeolitic molecular sieves. U.S. Pat. No. 4,500,651 discloses titanium-containing molecular sieves synthesized by hydrothermal crystallization from a reaction mixture comprising reactive source of titanium, aluminum and phosphorus, which may be alcoholates, esters or chelates containing those elements.

SUMMARY OF THE INVENTION

A method is provided for synthesis of crystalline metallophosphoaluminates, some of which have microporosity and catalytic activity, all of which exhibit ion-exchange properties and the ready ability for conversion to material having catalytic activity. The method comprises effecting hydrothermal crystallization in the presence of a substantially water-immiscible organic solvent such as a $C_5$–$C_{10}$ alcohol or mineral spirits, as non-limiting examples, sources of a metal, hereinafter more specifically defined, phosphorus and aluminum, and wherein at least one of the said sources is soluble in the water-immiscible organic solvent, and an organic directing agent.

The organic directing agent is selected from the group consisting of organic mono-, di- or polyamines and onium compounds having the following formula:

wherein R or R' is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; E is a tetracoordinate element (e.g., nitrogen, phosphorus) or a heteroatom (e.g., N, O, S, Se, P, As, etc.) in an alicyclic, heteroalicyclic or heteroaromatic structure; and X is an anion (e.g., fluoride, chloride, bromide, iodide, hydroxide, acetate, sulfate, carboxylate, etc.). When E is a heteroatom in an alicyclic, heteroalicyclic or heteroaromatic structure, such structure may be, as non-limiting examples,

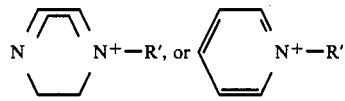

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms. The directing agent, depending on its solubility, may appear initially in the organic or aqueous phase of the reaction mixture.

Particularly preferred directing agents for the present method include alkylamines wherein alkyl is of 1 to 3 carbon atoms and onium compounds, above defined, wherein R is alkyl of 1 to 4 carbon atoms, R' is alkyl of 1 to 6 carbon atoms, E is nitrogen and X is halide or hydroxide. Non-limiting examples of these include di-n-propylamine, tetrapropylammonium hydroxide, tetraethylammonium hydroxide and tetrapropylammonium bromide, and hexamethyl-hexane diammonium hydroxide or bromide.

The present method then comprises maintaining the reaction mixture under critical conditions of temperature, pH and heating rate to synthesize the desired metallophosphoaluminate. The reaction mixture must be heated at a rate of from about 5° C. to about 200° C. per hour up to a temperature of from about 80° C. to about 300° C. and maintained there for from about 2 hours to about 500 hours until crystals of metallophosphoaluminate are formed. The pH of the reaction mixture must be maintained at from about 2 to about 9, and preferably from about 5 or 6 to 8, during the heating and crystallization period. This may be accomplished by adjusting the concentration(s) of the added base(s). The added base may be an inorganic base such as NaOH and/or a quaternary ammonium hydroxide. Other inorganic bases or salts can also be present and/or be used to adjust the pH of the reaction mixture, non-limiting examples of which include KOH, CsOH, Ca(OH)$_2$, NaCl, CsBr, and the like. The cations, particularly alkali metal cations, anion and particularly monovalent anions such as halide and hydroxide, of these inorganic salts may be incorporated into the metallophosphoaluminate product.

After crystals of the desired metallophosphoaluminate are formed, they may be separated from the reaction mixture by filtration, and then washed with water and dried, such as by heating.

The metallophosphoaluminates are characterized by compositions in which the number of atoms of aluminum and phosphorus, is greater than the number of atoms of non-aluminum metal plus silicon, hereinafter more particularly defined and presented as "M", i.e., Al+P>M. They are named "metallophosphoaluminates" in view of their crystalline composition and of the charge distribution on their framework tetrahedral T-sites. Their characteristic composition, in the anhydrous state and as synthesized, is as follows:

$$A_v{:}Q_r{:}(AlO_2{}^-)_{1-x}{:}(PO_2{}^{m-4})_{x+y}{:}T_j$$

wherein v is moles of A, occluded organic material resulting from organic directing agent and/or organic solvent used in synthesis of and filling microporous voids of the metallophosphoaluminate, which material may be removed upon calcination, Q is an alkali metal cation, T is a monovalent anion, particularly halide or hydroxide, and M is one or more elements of valence m other than Al or P. M is usually, but not necessarily, metallic. In particular, M can be one or more elements other than Al or P in addition to Si, wherein m is the weighted average valence of M. In other words, with N being an element of valence n other than Al, P or Si; k being an index defining the element N; and r being the amount of N;

$$M = \Sigma r_k N_k + sSi$$

with all $r_k$ and s satisfying the relationship $\Sigma r_k + s = 1$. It is understood that m is a weighted average of the valences of the elements $N_k$ ($n_K+$) and Si(+4), where $$m = \Sigma r_k + 4s$$

The designations x, y, i and j are numbers which satisfy the following relationships relative the number z:

$$z = i - j$$

$$z = y - x + (4 - m){\cdot}(x + y)$$

wherein z is a number of from greater than −1 to less than +1. When z is greater than 0, the metallophosphoaluminate will mostly behave as a cation exchanger with potential use as an acidic catalyst. When z is less than 0, the metallophosphoaluminate will mostly behave as an anion exchanger with potential use as a basic catalyst. The metallophosphoaluminate will exhibit an ion exchange capacity of at least about 0.002 meq/g.

The element M is characterized by its oxidation number which can vary from +2 to +6, and its ionic "Radius Ratio" which is in the range of 0–0.15 to 0.73. When the oxidation number of M is +2, the Radius Ratio of the element M must be from 0.52 to 0.62.

The term "Radius Ratio" as defined as the ratio of the crystal ionic radius of the element M to the crystal ionic radius of the oxygen anion, $O^{-2}$.

Radius Ratio = $\dfrac{\text{crystal ionic radius of the element } M}{\text{crystal ionic radius of } O^{-2}}$ The crystal ionic radii of elements are listed in the CRC Handbook of Chemistry and Physics, 61st Edition, CRC Press, Inc., 1980, pages F-216 and F-217, said listing incorporated herein by reference. In determining the Radius Ratio, it is necessary to use crystal ionic radii of the M atom and oxygen anion ($O^{-2}$) which have been measured by the same method.

Non-limiting examples of elements (M) useful herein include:

| M | Valence | Radius Ratio |
|---|---|---|
| As | +3 | 0.44 |
| B | +3 | 0.17 |
| Bi | +3 | 0.73 |
| Co | +2 | 0.55 |
| Cu | +2 | 0.54 |
| Fe | +2 | 0.56 |
| Fe | +3 | 0.48 |
| Ge | +2 | 0.55 |
| Ge | +4 | 0.40 |
| Mn | +2 | 0.61 |
| Sb | +3 | 0.57 |
| Ti | +3 | 0.58 |
| Ti | +4 | 0.52 |
| V | +3 | 0.56 |
| V | +4 | 0.48 |
| Zn | +2 | 0.56 |
| V | +5 | 0.45 |

Non-limiting examples of elements not includes as "M" of the present invention include:

| Element | Valence | Radius Ratio |
|---|---|---|
| B | +1 | 0.26 |
| Ba | +1 | 1.16 |
| Ba | +2 | 1.02 |
| Ce | +3 | 0.78 |
| Cd | +1 | 0.86 |
| Cd | +2 | 0.73 |
| Cr | +1 | 0.61 |
| Cr | +2 | 0.67 |
| Cu | +1 | 0.73 |
| La | +1 | 1.05 |

| Element | Valence | Radius Ratio |
| --- | --- | --- |
| Mg | +1 | 0.62 |
| Mg | +2 | 0.50 |
| Mo | +1 | 0.70 |
| Sn | +2 | 0.70 |
| Sr | +2 | 0.85 |
| Th | +4 | 0.77 |
| Ti | +1 | 0.73 |
| Ti | +2 | 0.71 |
| Zn | +1 | 0.67 |

The composition of the metallophosphoaluminate, following removal of the organic component, for example by calcination, is the following:

$$Q_i:(AlO_2^-)_{1-x}:(PO_2^+)_{1-y}:(MO_2^{m-4})_{x+y}:T_i$$

where all symnbols and letters have their aforementioned meanings.

Stating it another way, the present invention is an improvement in the synthesis of metalloaluminophosphates by hydrothermal crystallization, which comprises effecting hydrothermal crystallization in the presence of a substantially water-immiscible organic solvent, and wherein at least one of the sources of the metal, phosphorus and aluminum is soluble in that organic solvent.

EMBODIMENTS

The synthetic crystalline metallophosphoaluminates prepared by the present method are effective cationic ion-exchangers and acid catalysts when the aforementioned parameter z is greater than zero. Such catalysts have an acid strengtrh spectrum differing from that of aluminosilicate zeolites, which can be beneficial in some catalytic processes. For values of z lower than zero, anionic exchange properties prevail and render such materials active for base-catalyzed reactions. As these materials may contain transition metal ions as the M species, they may perform catalytically as other transition metal catalyst compositions known in the said art. They also offer a new class of catalyst supports for metals and metal oxides and are particularly interesting in this respect because of their ion-exchange capacity. They will show in the latter case the same catalytic flexibility as other supported metal catalysts. Sorption properties indicate that microporous metallophosphoaluminates may be molecular shape selective and this can be advantageous in numerous catalytic processes as known the art of zeolite catalysis.

As synthesized, in general, the crystalline metallophosphoaluminates comprise structural aluminum, phosphorus and non-aluminum, non-phosphorus element M, and will exhibit a M/aluminum plus phosphorus atomic ratio of less than unity and greater than zero, and usually within the range of from about 0.02 to about 0.95. The phosphorus/aluminum atomic ratio of such materials may be found to vary from about 0.01 to about 100.0, as synthesized. It is well recognized that aluminum phosphates exhibit a phosphorus/aluminum atomic ratio of unity, and no element M. Also, the phosphorus-substituted zeolite compositions, sometimes referred to as "aluminosilicophosphate" zeolites, have a silicon/aluminum atomic ratio of usually greater than unity, and generally from 0.66 to 8.0, and a phosphorus/aluminum atomic ratio of less than unity, and usually from 0 to 1.

The use of a two-phase synthesis reaction mixture system, exclusive of the solids, including a substantially water-immiscible organic solvent, enables one to maintain in solution in the organic solvent one or more of the reactants which are normally insoluble or unstable in the aqueous phase under the present synthesis conditions. Such a procedure enables the preparation of desirable metallophosphoaluminates. Further, microporous properties can be achieved for the crystalline metallophosphoaluminates by performing inorganic syntheses in the presence of organic directing agents. In addition to its templating role, the organic directing agent can also act as a surfactant. It can help the codispersion of the organic and aqueous phases containing the reagents.

In the synthesis method of the present invention, the reaction mixture will contain sources of element M, phosphorus and aluminum, directing agent(s) D, and a substantially water-immiscible organic solvent (So) as defined above.

The overall molar composition of the two-phase synthesis mixture, in terms of oxides and organic components, is:

$$(D)_a:(Q_2O)_b:(Al_2O_3)_c:(P_2O_5)_d:(MO_{m/2})_e:(So)_f:(T)_g:(H_2O)_h$$

where $a/(c+d+e)$ is greater than 0 but less than 4, $b/(c+d+e)$ less than 2, $e/(c+d)$ is greater than 0 but less than 2, $f/(c+d+e)$ is from 0.1 to 15, $g/(c+d+e)$ is less than 2, and $h/(c+d+e)$ is from 3 to 150. Under certain circumstances, b and/or g may be zero; but a, c, d, e, f and h cannot be zero.

The reaction mixture, as initially provided, contains at least one of the sources of the metal, as herein defined, aluminum or phosphorus, dissolved or dispersed in the organic solvent layer. The reaction mixture is then heated carefully at a rate of from about 5° C. to about 200° C. per hour up to a temperature of from about 80° C. to about 300° C. and maintained within that temperature range until crystals of desired metallophosphoaluminate form, usually from about 5 hours to about 500 hours. The reactants are mixed during heating by spinning the reaction vessel, stirring or other conventional means for effecting mixing to admix the components of the reaction mixture and the water-immiscible organic solvent layer and the aqueous layer with each other. The pH of the reaction mixture during crystallization is carefully maintained at from about 2 to about 9, or more preferably between 5 or 6 and 8. This may be accomplished by adjusting the concentration of the added bases.

Following crystallization of the desired metallophosphoaluminate, the reaction mixture containing same is filtered and the recovered crystals are washed, for example with water, and then dried, such as by heating at from about 25° C. to about 150° C. at atmospheric pressure.

The useful sources of aluminum include, as non-limiting examples, any known form of aluminum oxide or hydroxide, organic or inorganic esters and salts of aluminum or other organic compounds containing aluminum.

The useful sources of element M include, as non-limiting examples, any known form of non-aluminum, non-phosphorus element, e.g., metal, its oxide or hydroxide or salt, alkoxy or other organic compound containing M.

The useful soruces of phosphorus include, as non-limiting examples, any known form of phosphorus acids or oxides phosphates and phosphites, and organic derivatives of phosphorus.

The substantially water-immiscible organic solvent may be, for example, one or more compounds selected from the group consisting of alcohols, e.g., organic hydroxy compounds including alkanols of from 5 to about 10 carbon atoms, ethers containing 5 to 10 carbon atoms, petroleum ether, hydrocarbons and the like. Polar solvents such as the alcohols are preferred.

The aqueous phase of the reaction mixture comprises from the sources of phosphorus, aluminum and M those not included in the organic phase.

In a more specific but non-limiting illustration of the present synthesis method, the aqueous phase contains the sources of phosphorus and aluminum, for example phosphoric acid and alumina. The substantially water-immiscible solvent, hexanol, contains the element M, e.g., metal, source, as its tetraorthoalkoxide. The organic directing agent, e.g., tetraalkylammonium hydroxide, also acts as a surfactant to emulsify the aqueous and organic phases and optimize the interface. M is progressively supplied during synthesis to the gel by hydrolysis of the tetra-orthoalkoxide and transfer of the M-containing hydrolysate through the interface into the aqueous phase.

As element M, e.g., metal, aluminum and phosphorus must be available simultaneously to nucleate and crystallize metallophosphoaluminate, the rates of supply of all three elements have to be comparable. This implies that the neutralization reaction between $H_3PO_4$ and $Al_2O_3$ and the hydrolysis of the organic M-containing compound have to be concerted. Therefore, it may be important to predigest the alumina-phosphoric acid mixture. Even more critical will be the element M, e.g. metal, supply rate which is dependent on factors such as the magnitude of the interface, temperature, pH of the aqueous phase, concentration, and nature of the organic solvent and of the source of M.

A screening of information from numerous syntheses performed over a range of conditions shows that the metallophosphoaluminate crystallization by the present method occurs in two steps. The first step involves formation of an M-P-Al-containing gel at relatively low temperature and short time, thereby allowing for hydrolysis and transfer of M and preventing growth of aluminum phosphates. The second step involves crystallization of the metallophosphoaluminate from the gel at a higher temperature. Similar considerations apply when the source of Al of P, rather than M, is soluble in the water-immiscible organic solvent.

Because the hydrolysis and transfer rates of the organic solvent soluble source are controlled by the magnitude of the interface, as discussed earlier, its incorporation is expected to be favored as mixing of the reactants or stirring of the reaction mixture is increased.

As mentioned earlier, pH is a critical synthesis variable. As the formation of the metallophosphoaluminate proceeds, pH values around or above neutral (i.e., preferably about 5 or 6, up to a maximum of 9) should be maintained. As the base stability of metallophosphoaluminates is expected to be intermediate between those of aluminum phosphates and zeolites, pH values of about or slightly above 8 are preferred. Because of the major role played by hydrolysis, there is a need to have a nearly constant pH during crystallization (in particular, to avoid rapid acid hydrolysis of the organic M, Al or P source). This can be achieved by prediges-tion of alumina in phosphoric acid before addition of the other reagents, which raises the initial pH of the synthesis mixture to 5-7. Inorganic bases may be added to achieve and maintain higher pH values (pH=8 or above).

The method of the present invention has the advantage of simplicity in operation and generally provides a homogeneous structure having the metal relatively uniformly distributed throughout the structure. The metallophosphoaluminates prepared hereby may be molecular sieves or other framework structures, in which case they will possess definite distinguishing crystalline structures which exhibit characteristic X-ray powder diffraction patterns.

When X-ray values are determined for the metallophosphoaluminates of the present invention, the radiation is the K-alpha doublet of copper and a diffractometer equipped with a scintillation counter and an associated computer is used. The peak heights, I, and the positions as a function of 2 theta, where theta is the Bragg angle, are determined using algorithms on the computer associated with the spectrometer. From these, the relative intensities, 100 $I/I_o$, where $I_o$ is the intensity of the strongest line or peak, and d.(obs.) the interplanar spacing in Angstroms (A), corresponding to the recorded lines, are determined. The relative intensities are given in terms of the strongest line being taken as 100. The various cationic forms of particular metallophosphoaluminates reveal substantially the same pattern with some shifts in interplanar spacing and variation in relative intensity. Other variations can occur, depending on the element M to aluminum and phosphorus to aluminum ratios of the particular sample, as well as its degree of thermal treatment.

Some metallophosphoaluminates are microporous materials with a framework containing tetrahedrally coordinated (by oxygen) M, P and Al atoms. They show ion-exchange, acidic, and catalytic properties which resemble those of zeolites. Because of their different acid strength spectrum, however, they are potentially interesting as catalysts for acid-catalyzed conversions in which too high or too low an acidity may result in unwanted secondary reactions. For example, acidity associated with framework Al is brought in by replacement of phosphorus with a tetravalent non-aluminum metal. Alternately, basicity associated with framework P occurs when framework Al is replaced by the tetravalent non-aluminum metal.

The metallophosphoaluminates synthesized hereby can also be used as catalysts in intimate combination with a metal component such as silver, tungsten, vanadiuim, molybdenum, rhenium, chromium, manganese, or a Group VIII metal such as platinum or palladium where for example a hydrogenation-dehydrogenation or oxidation function is to be performed. Such component can be ion-exchanged into the composition, impregnated therein or intimately physically admixed therewith. Such component can be impregnated in or onto it such as for example, by, in the case of platinum, treating with crystal with a solution containing a platinum metal-containing ion. Thus, suitable platinum compounds include chloroplatinic acid, platinum chloride and various compounds containing the platinum amine complex.

The original cations or anions of the as synthesized metallophosphoaluminates can be replaced in accordance with techniques well known in the art, at least in part, by ion exchange with other cations or anions. Preferred replacing cations include metal ions, hydrogen ions, hydrogen precursor, e.g., ammonium, ions and mixtures thereof. Particularly preferred cations include hydrogen, rare earth metals and metals of Groups IIA, IIIA, IVA, IB, IIB, IIIB, IVB, VIB and VIII of the Periodic Table of Elements.

Typical ion exchange technique would be to contact the synthetic crystalline metallophosphoaluminate with a salt of the desired replacing ion or ions. Examples of such salts of cations include the halides, e.g., chlorides, nitrates and sulfates.

The metallophosphoaluminate prepared in accordance herewith can be beneficially converted to another form by thermal treatment. This thermal treatment is generally performed by heating one of these forms at a temperature of at least 350° C. for at least 1 minute and generally not longer than 20 hours. While subatmospheric pressure can be employed for the thermal treatment, atmospheric pressure is desired for reasons of convenience. The thermal treatment can be performed at a temperature up to about 1000° C. The thermally treated product is particularly useful in the catalysis of certain hydrocarbon conversion reactions.

Further, the metallophosphoaluminate, when employed either as an adsorbent, ion-exchanger or as a catalyst in an organic compound conversion process should be dehydrated, at least partially. This can be done by heating to a temperature in the range of 200° C. to 600° C. in air or an inert atmosphere, such as nitrogen, etc. and at atmospheric, subatmospheric or superatmospheric pressures for between 30 minutes and 48 hours. Dehydration can also be performed at room temperature merely by placing the metallophosphoaluminate in a vacuum, but a longer time is required to obtain a sufficient amount of dehydration. Therefore, depending upon the degree of dehydration or thermal treatment desired for the metallophosphoaluminate, it may be subjected to heating at a temperature of from about 200° C. to about 1000° C. for a time of from about 1 minute to about 48 hours.

The crystals of the metallophosphoaluminate prepared by the instant invention can be shaped into a wide variety of particle sizes. Generally speaking, the particles can be in the form of a powder, a granule, or a molded product, such as an extrudate having a particle size sufficient to pass through a 2 mesh (Tyler) screen and be retained on a 400 mesh (Tyler) screen. In cases where the composition is molded, such as by extrusion, the crystals can be extruded before drying or partially dried and then extruded.

In the case of many catalysts, it is desired to incorporate the metallophosphoaluminate with another material resistant to the temperatures and other condition employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new metallophosphoaluminate, i.e., combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with trhe new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina or silica.

In addition to the foregoing materials, the metallophosphoaluminate crystal can be composited with a porous matrix material such as aluminum phosphate, silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline metallophosphoaluminate material and inorganic oxide gel matrix vary widely, with the crystal content ranging from about 1 to about 90 percent by weight and more usually, particularly when the composite is prepared in the form of beads or extrudates, in the range of about 2 to about 80 weight percent of the composite.

In order to more fully illustrate the nature of the invention and the manner of practicing same, the following examples are presented. In the examples, whenever adsoprtion data are set forth for comparison of sorptive capacities for various adsorbates, they were determined as follows:

A weighed sample of the calcined adsorbent was contacted with a flowing stream of the equilibrium vapor of the adsorbate at 25° C. admixed with dry nitrogen. The adsorbates were water vapor, n-hexane, 2-methylpentane, xylene, or cyclohexane vapors. The sample temperature was maintained at 90° C. for adsorbates other than ortho-xylene for which it was 120° C. and water for which it was 60° C. The increase in weight measured gravimetrically was converted to the adsorption capacity of the sample in g/100 g of calcined (450° C. at 20° C. per minute in air) adsorbent.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). In the case of zeolite HZSM-5, only 174 ppm of tetrahedrally coordinated $Al_2O_3$ are required to provide an Alpha Value of 1. The Alpha Test is described in U.S. Pat. No. 3,543,078 and in *The Journal of Catalysis*, Vol. IV, pp. 522–529 (August 1965), each incorporated herein by reference as to that description.

When ion-exchange capacity is examined, it is determined by titrating with a solution of sulfamic acid the gaseous ammonia evolved during the temperature programmed decomposition of the ammonium-form of the silicophosphoaluminate. The method is described in *Thermochimica Acta*, Vol. III, pp. 113–124, 1971 by G. T. Kerr and A. W. Chester, incorporated herein by reference as to that description.

EXAMPLE 1

A two-phase synthesis reaction mixture was prepared with the organic phase comprised of 11 g of Ti-$(OC_2H_5)_4$ and 60 g of 1-hexanol, and the aqueous phase comprised of 23.1 g of $H_3PO_4$ (85%), 10 g of $Al_2O_3$, 37 g tetraethylammonium hydroxide (40%) and 71 g of water. The reaction mixture, containing 10.8 atom % Ti, 45 atom % P and 44.2 atom % Al, was heated at 50° C. per hour to 130° C. and maintained at that temperature for 24 hours. It was then heated to 180° C. and maintained there for 144 hours. During this time, mixing was obtained by spinning at 800 rpm. Initial and final pH was 7.

The crystallization product was separated from the reaction mixture by filtration, water washed and then dried at 80° C. The product, crystalline titanophosphoaluminate, had the composition 0.8 atom % Ti, 50.0 atom % P, and 49.2 atom % Al. A sample of the as synthesized titanophosphoaluminate was then submitted for X-ray analysis. It was found to be a crystalline molecular sieve exhibiting the characteristic diffraction lines shown in Table 1.

TABLE 1

| Interplanar d-Spacings (A) | Observed 2 X Theta | Relative Intensities $I/I_o$ |
|---|---|---|
| 11.7888 | 7.493 | 84.33 |
| 6.8098 | 12.990 | 12.26 |
| 5.8972 | 15.011 | 32.94 |
| 4.4601 | 19.890 | 72.79 |
| 4.2233 | 21.018 | 81.28 |
| 3.9476 | 22.504 | 100.00 |
| 3.5901 | 24.779 | 6.46 |
| 3.4113 | 26.100 | 22.94 |
| 3.0664 | 29.097 | 17.82 |
| 2.9540 | 30.231 | 24.44 |
| 2.6548 | 33.734 | 8.08 |
| 2.5788 | 34.759 | 21.55 |

EXAMPLE 2

A quantity of the crystalline titanophosphoaluminate of Example 1 was calcined at 450° C. in air for 4 hours and then X-ray analyzed. The results are presented in Table 2.

TABLE 2

| Interplanar d-Spacings (A) | Observed 2 X Theta | Relative Intensities $I/I_o$ |
|---|---|---|
| 11.9513 | 7.391 | 100.00 |
| 6.8851 | 12.847 | 20.38 |
| 5.9644 | 14.841 | 8.06 |
| 4.5079 | 19.677 | 33.90 |
| 4.1992 | 21.140 | 41.54 |
| 3.9702 | 22.374 | 58.93 |
| 3.5845 | 24.818 | 2.48 |
| 3.4427 | 25.858 | 20.72 |
| 3.0772 | 28.993 | 12.35 |
| 2.9839 | 29.920 | 13.41 |
| 2.6639 | 33.615 | 3.96 |
| 2.6038 | 34.414 | 12.27 |

EXAMPLE 3

A quantity of the crystalline titanophosphoaluminate of Example 1 was calcined as described in Example 2 and ammonium-exchanged using an aqueous solution of 1M $NH_4NO_3$. The ion-exchange capacity measured from the evolution of ammonia was determined to be 0.361 meq/g.

EXAMPLE 4

The product of Example 3 was examined by the Alpha Test and found to have an Alpha Value of 0.5.

EXAMPLE 5

A sample of the calcined product titanophosphoaluminate of Example 3 was evaluated for sorption properties to confirm its molecular sieve nature. The results in weight percent were as follows:
hexane (90° C.): 3.35%,
water (60° C.): 0.84%.

EXAMPLE 6

A two-phase synthesis reaction mixture was prepared with the organic phase comprised of 11 g of Ti-$(OC_2H_5)_4$ and 60 g of 1-hexanol, and the aqueous phase comprised of 23.1 g of $H_3PO_4$ (85%), 10 g of $Al_2O_3$, 31 g of tetramethylammonium hydroxide (25%) and 70 g of water. The reaction mixture, containing 10.8 atom % Ti, 45 atom % P and 44.2 atom % Al, was heated at 50° C. per hour to 130° C. and maintained at that temperature for 24 hours. It was then heated to 180° C. and maintained there for 144 hours. During this time, mixing was obtained by spinning at 800 rpm. The initial and final pH was 7.5.

The crystalline product was separated from the reaction mixture by filtration, water washed and then dried at 80° C. The product, crystalline titanophosphoaluminate, had the composition 12.3 atom % Ti, 50.2 atom % P, and 37.5 atom % Al. A sample of the as synthesized titanophosphoaluminate was then submitted for X-ray analysis. It was found to be a crystalline molecular sieve exhibiting the diffraction lines shown in Table 3.

TABLE 3

| Interplanar d-Spacings (A) | Observed 2 X Theta | Relative Intensities $I/I_o$ |
|---|---|---|
| 6.3130 | 14.017 | 50.11 |
| 4.4639 | 19.873 | 40.22 |
| 3.9923 | 22.249 | 9.21 |
| 3.6437 | 24.409 | 100.00 |
| 3.3697 | 26.428 | 27.06 |
| 3.1570 | 28.244 | 18.28 |
| 2.8253 | 31.642 | 12.71 |
| 2.5792 | 34.753 | 21.29 |

EXAMPLE 7

A quantity of the crystalline titanophosphoaluminate of Example 6 was calcined at 450° C. in air for 4 hours and then X-ray analyzed. The results are presented in Table 4.

TABLE 4

| Interplanar d-Spacings (A) | Observed 2 X Theta | Relative Intensities $I/I_o$ |
|---|---|---|
| 6.2896 | 14.069 | 88.77 |
| 4.4518 | 19.928 | 36.91 |
| 3.9821 | 22.307 | 6.65 |
| 3.6336 | 24.478 | 100.00 |
| 3.1496 | 28.312 | 24.27 |

TABLE 4-continued

| Interplanar d-Spacings (A) | Observed 2 X Theta | Relative Intensities I/I$_o$ |
|---|---|---|
| 2.8197 | 31.707 | 17.55 |
| 2.5728 | 34.842 | 21.41 |

EXAMPLE 8

A quantity of the crystalline titanophoaluminate of Example 6 was calcined as described in Example 7 and ammonium-exchanged using an aqueous solution of 1M NH$_4$NO$_3$. The ion-exchange capacity measured from the evolution of ammonia was determined to be 0.472 meq/g.

EXAMPLE 9

The synthesis of Example 1 was repeated except that 12 g of Ge (OC$_2$H$_5$)$_4$ replaced the titanium reagent. Initial pH was 6.5 and the final pH was about 7. The resulting product, crystalline germanophosphoaluminate, had the composition 0.01 atom % Ge, 49.35 atom % P and 50.64 atom % Al, and showed the X-ray diffraction pattern of Table 5.

TABLE 5

| Interplanar d-Spacings (A) | Observed 2 X Theta | Relative Intensities I/I$_o$ |
|---|---|---|
| 11.7908 | 7.491 | 77.43 |
| 6.8111 | 12.987 | 11.72 |
| 5.8997 | 15.004 | 32.03 |
| 4.4617 | 19.883 | 73.68 |
| 4.2249 | 21.010 | 77.79 |
| 3.9501 | 22.490 | 100.00 |
| 3.5911 | 24.772 | 6.07 |
| 3.4177 | 26.050 | 52.92 |
| 3.0678 | 29.084 | 18.00 |
| 2.9554 | 30.216 | 24.28 |
| 2.6563 | 33.714 | 7.71 |
| 2.5804 | 34.737 | 21.87 |

EXAMPLE 10

A quantity of the crystalline germanophosphoaluminate of Example 9 was calcined at 450° C. in air for 4 hours and then X-ray analyzed. The results are presented in Table 6.

TABLE 6

| Interplanar d-Spacings (A) | Observed 2 X Theta | Relative Intensities I/I$_o$ |
|---|---|---|
| 11.6198 | 7.602 | 94.26 |
| 6.7252 | 13.154 | 25.20 |
| 5.8292 | 15.187 | 10.87 |
| 4.4056 | 20.139 | 29.82 |
| 4.0399 | 21.984 | 15.05 |
| 3.9276 | 22.621 | 100.00 |
| 3.6255 | 24.533 | 5.17 |
| 3.3707 | 26.420 | 35.81 |
| 3.0865 | 28.904 | 18.65 |
| 3.0349 | 29.406 | 12.04 |
| 2.9222 | 30.567 | 22.28 |
| 2.6595 | 33.672 | 6.85 |

EXAMPLE 11

A quantity of the crystalline germanophosphoaluminate of Example 9 was calcined as described in Example 10 and ammonium-exchanged using an aqueous solution of 1M NH$_4$NO$_3$. The ion-exchange capacity measured from the evolution of ammonia was determined to be 1.25 meq/g.

EXAMPLE 12

The product of Example 11 was examined by Alpha Test and found to have an Alpha Value of 0.6.

EXAMPLE 13

A sample of the calcined product germanophosphoaluminate of Example 11 was evaluated for sorption properties to confirm its molecular sieve nature. The results in weight percent were as follows:
hexane (90° C.): 2.87%,
water (60° C.): 0.59%.

EXAMPLE 14

The synthesis of Example 6 was repeated except 12 g Ge(OC$_2$H$_5$)$_4$ replaced the titanium reagent. Initial and final pH was 7.5. The resulting product crystalline germanophosphoaluminate had the composition 4.4 atom % Ge, 50.0 atom % P and 45.6 atom % Al, and showed the characteristic X-ray diffraction pattern of Table 7.

TABLE 7

| Interplanar d-Spacings (A) | Observed 2 X Theta | Relative Intensities I/I$_o$ |
|---|---|---|
| 6.3046 | 14.036 | 48.14 |
| 4.4609 | 19.887 | 43.85 |
| 3.9898 | 22.263 | 7.52 |
| 3.6431 | 24.413 | 100.00 |
| 3.4258 | 25.988 | 68.73 |
| 3.3699 | 26.427 | 10.94 |
| 3.1550 | 28.262 | 17.00 |
| 2.8242 | 31.655 | 15.51 |
| 2.5780 | 34.769 | 22.07 |

EXAMPLE 15

A quantity of the crystalline germanophosphoaluminate of Example 14 was calcined at 450° C. in air for 4 hours and then X-ray analyzed. The results are presented in Table 8.

TABLE 8

| Interplanar d-Spacings (A) | Observed 2 X Theta | Relative Intensities I/I$_o$ |
|---|---|---|
| 6.3051 | 14.034 | 71.43 |
| 4.4604 | 19.889 | 43.55 |
| 3.9902 | 22.261 | 6.60 |
| 2.6431 | 24.413 | 100.00 |
| 3.4255 | 25.990 | 57.80 |
| 3.1556 | 28.257 | 18.11 |
| 2.8241 | 31.656 | 17.76 |
| 2.5784 | 34.765 | 24.57 |

EXAMPLE 16

A quantity of the crystalline germanophosphoaluminate of Example 14 was clacined as described in Example 15 and ammonium-exchanged using an aqueous solution of 1M NH$_4$NO$_3$. The ion-exchange capacity measured from the evolution of ammonia was determined to be 0.405 meq/g.

EXAMPLE 17

The synthesis of Example 1 was repeated except that 10 g Sb(OC$_2$H$_5$)$_3$ replaced the titanium reagent. Initial and final pH was 7.5. The resulting product crystalline antimonophosphoaluminate had a composition of 10.2 atom % Sb, 47.0 atom % P and 42.8 atom % Al, and showed the characteristic diffraction pattern of Table 9.

TABLE 9

| Interplanar d-Spacings (Å) | Observed 2 X Theta | Relative Intensities I/I$_o$ |
|---|---|---|
| 11.7773 | 7.500 | 36.84 |
| 6.8081 | 12.993 | 6.06 |
| 6.4249 | 13.771 | 14.98 |
| 5.8932 | 15.021 | 17.47 |
| 4.4565 | 19.907 | 39.72 |
| 4.2346 | 20.961 | 61.28 |
| 3.9485 | 22.499 | 56.02 |
| 3.5998 | 24.712 | 3.18 |
| 3.4047 | 26.152 | 19.91 |
| 3.2167 | 27.710 | 100.00 |
| 3.0683 | 29.078 | 10.12 |
| 2.9517 | 30.254 | 14.99 |
| 2.7879 | 32.079 | 41.42 |
| 2.6560 | 33.717 | 5.29 |
| 2.5752 | 34.809 | 13.39 |

EXAMPLE 18

A quantity of the crystalline antimonophosphoaluminate of Example 17 was calcined at 450° C. in air for 4 hours and then X-ray analyzed. The results are presented in Table 10.

TABLE 10

| Interplanar d-Spacings (Å) | Observed 2 X Theta | Relative Intensities I/I$_o$ |
|---|---|---|
| 11.8868 | 7.431 | 17.87 |
| 4.3356 | 20.468 | 31.16 |
| 4.1185 | 21.559 | 100.00 |
| 3.9570 | 22.450 | 21.24 |
| 3.4380 | 25.894 | 25.40 |
| 3.0728 | 29.035 | 64.02 |
| 2.9475 | 30.299 | 21.98 |
| 2.6532 | 33.755 | 13.83 |

EXAMPLE 19

A quantity of the crystalline antimonophosphoaluminate of Example 17 was calcined as described in Example 18 and ammonium-exchanged using an aqueous solution of 1M NH$_4$NO$_3$. The ion-exchange capacity measured from the evolution of ammonia was determined to be 1.3 meq/g.

EXAMPLE 20

The synthesis of Example 1 was repeated except that 7.0 g B(OC$_2$H$_5$)$_3$ replaced the titanium reagent. Initial and final pH was 7. The resulting product crystalline borophosphoaluminate had the composition of 0.1 atom % B, 49.7 atom % P and 50.2 atom % Al, and showed the X-ray diffraction pattern of Table 11.

TABLE 11

| Interplanar d-Spacings (Å) | Observed 2 X Theta | Relative Intensities I/I$_o$ |
|---|---|---|
| 11.7017 | 7.549 | 69.43 |
| 6.7721 | 13.062 | 12.02 |
| 5.8747 | 15.068 | 27.61 |
| 4.4422 | 19.971 | 55.76 |
| 4.2632 | 20.819 | 62.63 |
| 4.1992 | 21.140 | 100.00 |
| 3.9345 | 22.580 | 95.21 |
| 3.6375 | 24.451 | 7.40 |
| 3.5738 | 24.894 | 6.75 |
| 3.1480 | 28.327 | 3.87 |
| 3.0559 | 29.199 | 19.67 |
| 2.9492 | 30.281 | 17.97 |
| 2.6463 | 33.846 | 6.42 |
| 2.5746 | 34.817 | 14.01 |

EXAMPLE 21

A quantity of the crystalline borophosphoaluminate of Example 20 was calcined at 450° C. in air for 4 hours and then X-ray analyzed. The results are presented in Table 12.

TABLE 12

| Interplanar d-Spacings (Å) | Observed 2 X Theta | Relative Intensities I/I$_o$ |
|---|---|---|
| 11.8989 | 7.423 | 100.00 |
| 6.8705 | 12.874 | 19.45 |
| 6.9525 | 14.871 | 7.75 |
| 4.5020 | 19.703 | 32.93 |
| 4.1819 | 21.228 | 48.75 |
| 3.9619 | 22.422 | 59.25 |
| 3.4390 | 25.886 | 7.78 |
| 3.0715 | 29.048 | 11.61 |
| 2.9808 | 29.952 | 15.36 |
| 2.6591 | 33.677 | 5.08 |
| 2.6015 | 34.446 | 14.22 |

EXAMPLE 22

The synthesis of Example 1 was repeated except that 12.0 g VO(OC$_3$H$_7$)$_3$ replaced the titanium reagent. Initial pH was 6.5 and the final pH was 7.5. The resulting product crystalline vanadophosphoaluminate had a composition of 1.2 atom % V, 52.9 atom % P and 45.9 atom % Al, and the X-ray diffraction pattern listed in Table 13.

TABLE 13

| Interplanar d-Spacings (Å) | Observed 2 X Theta | Relative Intensities I/I$_o$ |
|---|---|---|
| 11.7702 | 7.505 | 9.29 |
| 7.2493 | 12.199 | 11.97 |
| 5.3449 | 16.572 | 75.01 |
| 5.2002 | 17.037 | 13.68 |
| 4.8924 | 18.117 | 27.65 |
| 4.7983 | 18.475 | 33.93 |
| 4.4613 | 19.885 | 4.81 |
| 4.2583 | 20.843 | 83.28 |
| 3.9109 | 22.718 | 100.00 |
| 3.6903 | 24.096 | 41.45 |
| 3.6184 | 24.582 | 21.75 |
| 3.4359 | 25.910 | 8.49 |
| 3.3905 | 26.263 | 9.63 |
| 3.2255 | 17.632 | 6.04 |
| 3.1834 | 28.006 | 9.53 |
| 3.0399 | 29.356 | 91.57 |
| 2.9122 | 30.675 | 56.41 |
| 2.8673 | 31.167 | 52.72 |
| 2.7598 | 32.413 | 17.96 |
| 2.6364 | 33.976 | 15.36 |
| 2.5745 | 34.819 | 15.88 |

EXAMPLE 23

A quantity of the crystalline vanadophosphoalukminate of Example 22 was calcined at 450° C. in air for 4 hours and then X-ray analyzed. The results are presented in Table 14.

TABLE 14

| Interplanar d-Spacings (Å) | Observed 2 X Theta | Relative Intensities I/I$_o$ |
|---|---|---|
| 11.8727 | 7.440 | 8.79 |
| 5.1882 | 17.076 | 35.68 |
| 4.3101 | 20.590 | 100.00 |
| 4.0891 | 21.716 | 78.26 |
| 3.9491 | 22.495 | 30.56 |
| 3.8573 | 23.038 | 15.57 |
| 3.5869 | 24.801 | 45.72 |
| 3.0458 | 29.298 | 16.01 |

TABLE 14-continued

| Interplanar d-Spacings (A) | Observed 2 X Theta | Relative Intensities I/I$_o$ |
|---|---|---|
| 2.9156 | 30.638 | 9.63 |
| 2.8746 | 31.086 | 5.13 |
| 2.6258 | 34.117 | 4.44 |

EXAMPLE 24

A two-phase reaction mixture was prepared in an autoclave by first mixing 23.1 g of 86.3% H$_3$PO$_4$, 30 g of H$_2$O, and 10.0 g of Al$_2$O$_3$ and allowing this solution to digest for 1 hour at 90° C. with stirring. To this solution was then added 92.0 ml of 2.12N "Diquat-6(OH)$_2$", i.e., HO(CH$_3$)$_3$N(CH$_2$)$_6$N(CH$_3$)$_3$OH, as directing agent. To the resulting mixture was then added 45.7 g of Fe(C$_8$H$_{15}$O$_2$)$_3$, iron (III) 2-ethylhexanoate, (52% in mineral spirits). The reaction mixture, having a composition in mole ratios of oxides as follows:

P$_2$O$_5$/Al$_2$O$_3$=1.0

H$_2$O/Al$_2$O$_3$=57.0

H$^+$/Al$_2$O$_3$=6.2

"Diquat-6"/Al$_2$O$_3$=1.0

Fe/Al$_2$O$_3$=0.5 was heated to 130° C. at 50° C. per hour and maintained at that temperature for one day with stirring. It was then heated to 180° C. and maintained at that temperature with stirring for 5 days. Initial and final pH ranged from 6 to 8. Stirring was at 800 rpm.

The crystalline product was separated from the reaction mixture by filtration, water washed and then dried at 80° C. The product crystalline ironphosphoaluminate had the composition, 9.94 atom % Fe, 19.71 atom % P, and 12.48 atom % Al. The calculated molar composition of this crystalline material is (Fe+Al)/P=1.01. A sample of the as synthesized ironphosphoaluminate was then submitted for X-ray analysis. It was found to be a crystalline molecular sieve with a sodalite-type structure exhibiting the characteristic diffraction lines shown in Table 15. Scanning electron photomicrographs of the product indicated it to have unique crystal morphology and to be about 5 microns in size.

TABLE 15

| Interplanar d-Spacings (A) | Observed 2 X Theta | Relative Intensities I/I$_o$ |
|---|---|---|
| 6.37 | 13.89 | 48.44 |
| 4.50 | 19.70 | 41.52 |
| 3.91 | 22.73 | 13.51 |
| 3.68 | 24.18 | 100.00 |
| 3.18 | 27.99 | 14.14 |
| 2.85 | 31.38 | 12.52 |
| 2.60 | 34.46 | 19.34 |

EXAMPLE 25

A quantity of the crystalline ironphosphoaluminate of Example 24 was calcined at 450° C. in air for 4 hours and ammonium exchanged using an aqueous solution of 1M NH$_4$NO$_3$. The temperature-programmed ammonia evolution peaks were at about 250° C. and 600° C. The total amount of ammonia released corresponds to 2.02 meq NH$_3$ per gram of sample. The 600° C. peak corresponds to 0.435 meq/g.

What is claimed is:

1. A method for synthesis of crystalline metallophosphoaluminate characterized by a composition, in the anhydrous state, as follows:

$$A_v:Q_i:(AlO_2^-)_{1-x}:(PO_2^+)_{1-y}:(MO_2^{m-4})_{x+y}:T_j$$

wherein A is occluded organic solvent and directing agent, v is the number of moles A, Q is an alkali metal cation, T is a monovalent anion, and M is one or more elements other than aluminum or phosphorus of valence m, and x, y, i and j are numbers which satisfy the relationship:

$$i-j=y-x+(4-m)\cdot(x+y),$$

said metallophosphoaluminate having an ion exchange capacity of at least about 0.002 meq/g, which comprises:

providing a reaction mixture comprising components in the following relationship:

$$(D)_a:(Q_2O)_b:(Al_2O_3)_c:(P_2O_5)_d:(MO_{m/2})_e:(So)_f:(T)_g:(H_2O)_h$$

wherein D is an organic directing agent, So is a substantially water-immiscible organic solvent and a, b, c, d, e, f, g, and h are numbers satisfying the following relationships:

a/(c+d+e) is greater than 0 but less than 4, b/(c+d+e) is less than 2, e/(c+d) is greater than 0 but less than 2, f/(c+d+e) is from 0.1 to 15, g/(c+d+e) is less than 2, and h/(c+d+e) is from 3 to 150, wherein upon initial provision of said reaction mixture the source of one of the M, Al or P oxides is dispersed or dissolved in the substantially water-immiscible organic solvent;

heating said reaction mixture at a rate of from about 5° C. to about 200° C. per hour to a temperature of from about 80° C. to about 300° C.;

maintaining said reaction mixture at a temperature of from about 80° C. to about 300° C. and a pH of from about 2 to about 9; and recovering said metallophosphoaluminate.

2. The method of claim 1, wherein the components of the reaction mixture are admixed with each other.

3. The method of claim 1, wherein M is characterized by an oxidation number of +2 to +6 and an ionic Radius Ratio of from 0.15 to 0.73.

4. The method of claim 1, wherein the pH of the reaction mixture is from about 6 to about 9.

5. The method of claim 4, wherein the pH is about 8.

6. The method of claim 1, which comprises the additional step of heating the recovered metallophosphoaluminate at a temperature of from about 200° to about 1000° C.; and wherein the heated metallophosphoaluminate is characterized by a composition, in the anhydrous state, as follows:

$$Q_i:(AlO_2^-)_{1-x}:(PO_2^+)_{1-y}:(MO_2^{m-4})_{x+y}:T_j$$

said heated metallophosphoaluminate having an ion exchange capacity of at least about 0.002 meq/g.

7. The method of claim 1, which comprises the additional step of replacing original alkali metal cations or monovalent anions of said recovered metallophosphoaluminate with other ions.

8. The method of claim 7, which comprises the additional step of heating said metallophosphoaluminate, having original ions replaced with other ions, at a temperature of from about 200° C. to about 1000° C.

9. The method of claim 7, wherein alkali metal cations are replaced and said other ions are cations selected from the group consisting of hydrogen, hydrogen precursor, rare earth metal and metal of Groups IIA, IIIA, IVA, IB, IIB, IIIB, VIB and VIII of the Periodic Table.

10. The method of claim 1, wherein the recovered metallophosphoaluminate is combined with a binder material.

11. The method of claim 5, wherein the heated recovered metallophosphoaluminate is combined with a binder material.

12. A reaction mixture for use in synthesis of a crystalline metallophosphoaluminate comprising components in the relationship:

$$(D)_a:(Q_2O)_b:(Al_2O_3)_c:(P_2O_5)_d:(MO_{m/2})_e:(So)_f:(T)_g:(H_2O)_h$$

a, b, c, d, e, f, g and h are numbers satisfying the following relationships:
- $a/(c+d+e)$ is greater than 0 but less than 4,
- $b/(c+d+e)$ is less than 2,
- $e/(c+d)$ is greater than 0 but less than 2,
- $f/(c+d+e)$ is from 0.1 to 15,
- $g/(c+d+e)$ is less than 2, and
- $h/(c+d+e)$ is from 3 to 150, wherein D is an organic directing agent, Q is an alkali metal cation, M is one or more elements other than aluminum or phosphorus of valence m and So is a substantially water-immiscible organic solvent and T is a monovalent inorganic anion and wherein the source of one of the M, Al or P oxides is initially dispersed or dissolved in the substantially water-immiscible organic solvent.

13. The reaction mixture of claim 12, wherein M is characterized by an oxidation number of from +2 to +6 and an ionic Radius Ratio of from 0.15 to 0.73.

* * * * *

UNITED STATES PATENT AND TRADEMARK OFFICE
CERTIFICATE OF CORRECTION

PATENT NO. : 4,713,227
DATED : December 15, 1987
INVENTOR(S) : Eric G. Derouane et al It is certified that error appears in the above-identified patent and that said Letters Patent is hereby corrected as shown below:

Column 3, line 45 "$A_v:Q_i:(AlO_2^-)_{1-x}:(PO_2^{m-4})_{x+y}:T_j$" should be

-- $A_v:Q_i:(AlO_2^-)_{1-x}:(PO_2^+)_{1-y}:(MO_2^{m-4})_{x+y}:T_j$ --

Column 3, line 70 "$m=\sum r_k+4s$" should be --$m=\sum r_k \cdot n_k+4s$--

Column 4, line 22 "as" [first occurrence] should be --is--

Column 5, line 51 insert --in-- after "known"

Signed and Sealed this

Thirty-first Day of May, 1988

Attest:

DONALD J. QUIGG

Attesting Officer

Commissioner of Patents and Trademarks